US012811210B2

(12) United States Patent
Gupta et al.

(10) Patent No.: US 12,811,210 B2
(45) Date of Patent: Nov. 24, 2026

(54) POWER MODULE WITH COOLING ARRANGEMENT

(71) Applicant: Ford Global Technologies, LLC, Dearborn, MI (US)

(72) Inventors: Man Prakash Gupta, Dearborn, MI (US); Alfredo R. Munoz, Ann Arbor, MI (US); Michael W. Degner, Novi, MI (US); Zhuxian Xu, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 983 days.

(21) Appl. No.: 17/987,615

(22) Filed: Nov. 15, 2022

(65) Prior Publication Data

US 2024/0162519 A1 May 16, 2024

(51) Int. Cl.

*H01M 10/613* (2014.01)
*H01M 10/625* (2014.01)
*H01M 10/6556* (2014.01)
*H01M 10/6566* (2014.01)

(52) U.S. Cl.

CPC ....... *H01M 10/613* (2015.04); *H01M 10/625* (2015.04); *H01M 10/6556* (2015.04); *H01M 10/6566* (2015.04); *H01M 2220/20* (2013.01)

(58) Field of Classification Search

CPC ........... H01M 10/613; H01M 10/6556; H01M 10/6566; H05K 7/20927; H05K 7/20872

See application file for complete search history.

(56) References Cited

U.S. PATENT DOCUMENTS

| | | | | |
|---|---|---|---|---|
| 6,536,516 | B2 | 3/2003 | Davies et al. | |
| 6,942,018 | B2 | 9/2005 | Goodson et al. | |
| 10,874,037 | B1 | 12/2020 | Gupta et al. | |
| 2006/0108098 | A1 * | 5/2006 | Stevanovic ........... | H01L 23/473 257/E23.098 |

* cited by examiner

*Primary Examiner* — Allison Bourke
*Assistant Examiner* — Travis L. Martin
(74) *Attorney, Agent, or Firm* — David B. Kelley; Brooks Kushman P.C.

(57) ABSTRACT

A power module, such as a power module of a traction powertrain of an electrified vehicle, includes a power module cell arranged in a stack that defines a coolant supply manifold and a coolant return manifold. The power module cell includes a power stage having a substrate. The substrate includes first microchannels configured to input coolant from the supply manifold and impeded from outputting coolant to the return manifold, second microchannels configured to output coolant to the return manifold and impeded from inputting coolant from the supply manifold, and third microchannels crisscrossing and connecting the first and second microchannels in fluid communication.

14 Claims, 8 Drawing Sheets

POWER MODULE WITH COOLING ARRANGEMENT

TECHNICAL FIELD

The present invention relates to thermal management of power modules.

BACKGROUND

An electrified vehicle includes a traction battery for providing power to a motor of the vehicle to propel the vehicle. The vehicle includes power modules for use in electrical power operations involving the traction battery.

SUMMARY

A power module including a power module cell is provided. The power module cell includes a power stage having a substrate. The power module cell is arranged in a stack that defines a supply manifold and a return manifold. The substrate includes first microchannels configured to input coolant from the supply manifold and impeded from outputting coolant to the return manifold, second microchannels configured to output coolant to the return manifold and impeded from inputting coolant from the supply manifold, and third microchannels crisscrossing and connecting the first and second microchannels in fluid communication.

In embodiments, the substrate includes a first edge and a second edge opposed from one another with the first microchannels extending from the first edge partially across the substrate towards the second edge and the second microchannels extending from the second edge partially across the substrate towards the first edge.

In embodiments, the first microchannels and the second microchannels are at least substantially parallel to one another.

In embodiments, the third microchannels are orthogonal to the first microchannels and to the second microchannels.

In embodiments, the substrate includes a first plate and a second plate. The first microchannels and the second microchannels are on the first plate and the third microchannels are on the second plate.

In embodiments, the substrate further includes first microchannel impeding portions which impede the first microchannels from outputting coolant to the return manifold and second microchannel impeding portions which impede the second microchannels from inputting coolant from the supply manifold.

In embodiments, the power module further includes a second power module cell arranged in the stack. The second power module cell includes a second power stage having a second substrate. The second substrate of the second power stage includes fourth microchannels configured to input coolant from the supply manifold and impeded from outputting coolant to the return manifold, fifth microchannels configured to output coolant to the return manifold and impeded from inputting coolant from the supply manifold, and sixth microchannels crisscrossing and connecting the fourth and fifth microchannels in fluid communication.

In embodiments, the power stage includes further includes a second substrate and a transistor-based switching arrangement sandwiched between the substrates.

In embodiments, the supply manifold and the return manifold are disposed on opposing sides of the stack.

In embodiments, the power module is a power module of a traction powertrain of an electrified vehicle.

A power module cell including a substrate and a microchannel network is also provided. The substrate includes a first edge and a second edge opposed from one another. The microchannel network includes first microchannels extending partially across the substrate from the first edge towards the second edge, second microchannels extending partially across the substrate from the second edge towards the first edge, and third microchannels crisscrossing and connecting the first and second microchannels in fluid communication.

In embodiments, the microchannel network further includes first microchannel impeding portions which impede the first microchannels from extending to the second edge of the substrate and second microchannel impeding portions which impede the second microchannels from extending to the first edge of the substrate.

A power module including a plurality of power module cells is also provided. Each power module cell includes a power stage having a substrate and a transistor-based switching arrangement supported on the substrate. The power module cells are arranged in a stack that defines a coolant supply manifold and a coolant return manifold disposed on opposing sides of the stack and extending along a length of the stack. For each power module cell, the substrate defines a network of microchannels connecting the coolant supply manifold and the coolant return manifold. The network of microchannels include first microchannels configured to input coolant directly from the coolant supply manifold and impeded from outputting coolant directly to the coolant return manifold, second microchannels configured to output coolant directly to the coolant return manifold and impeded from inputting coolant directly from the coolant supply manifold, and third microchannels crisscrossing and connecting the first and second microchannels in fluid communication.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
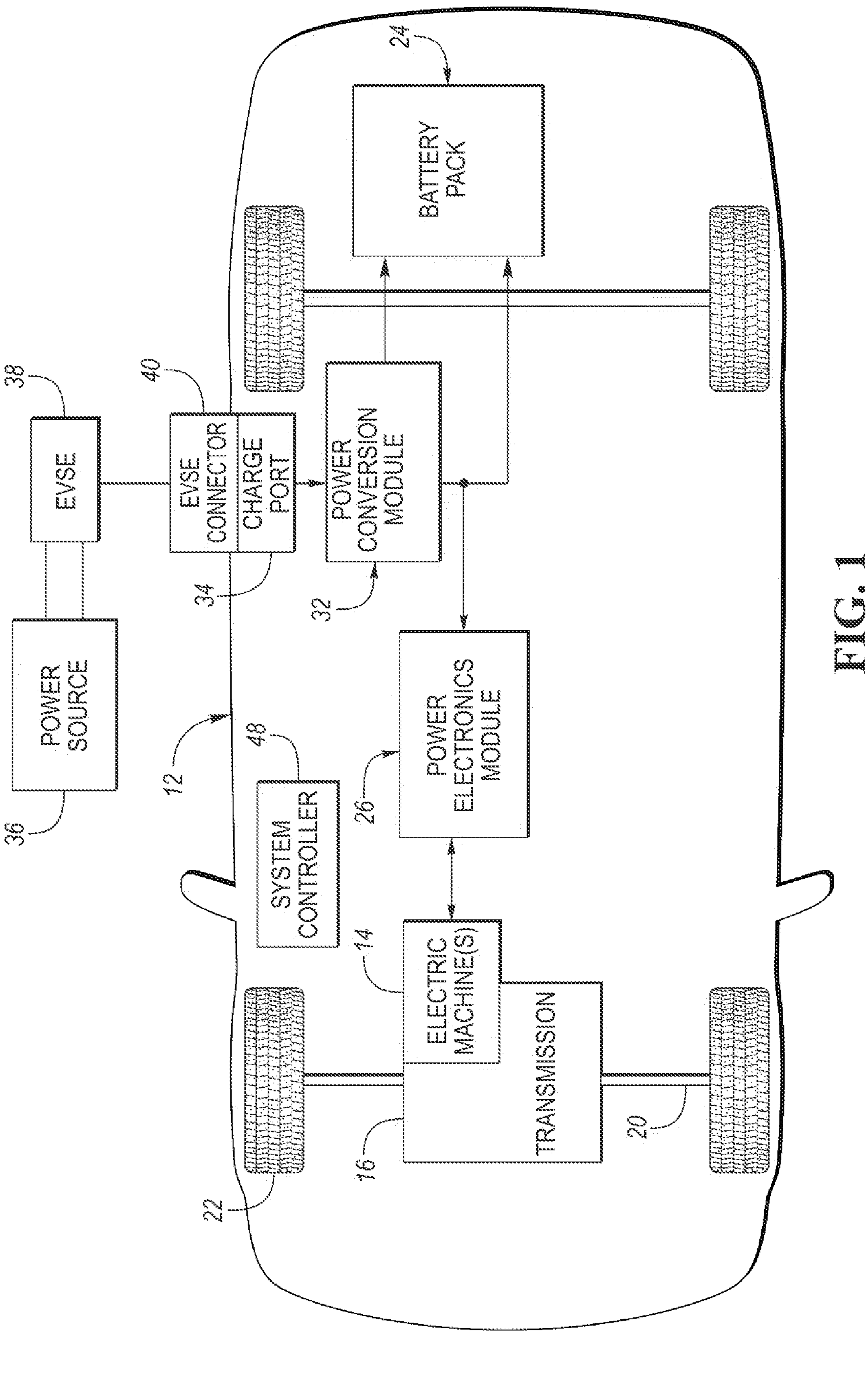
FIG. 1 illustrates a block diagram of an electrified vehicle.

Referring now to FIG. 1, a block diagram of an electrified vehicle (EV) 12 in the form of a battery electric vehicle (BEV) is shown. EV 12 includes a powertrain having one or more traction motors ("electric machine(s)") 14, a traction battery ("battery" or "battery pack") 24, and a power electronics module 26 (e.g., an inverter). In the BEV configuration, traction battery 24 provides all of the propulsion power and EV 12 does not have an engine. In other embodiments, EV 12 may be a hybrid electric vehicle (HEV) further having an engine for providing propulsion power.

Traction motor 14 is part of the powertrain of EV 12 for powering movement of the EV. In this regard, traction motor 14 is mechanically connected to a transmission 16 of EV 12. Transmission 16 is mechanically connected to a drive shaft 20 that is mechanically connected to wheels 22 of EV 12. Traction motor 14 can provide propulsion capability to EV 12 and is capable of operating as a generator. Traction motor 14 acting as a generator can recover energy that may normally be lost as heat in a friction braking system of EV 12.

Traction battery 24 stores electrical energy that can be used by traction motor 14 for propelling EV 12. Traction battery 24 typically provides a high-voltage (HV) direct current (DC) output. Traction battery 24 may be a lithium-ion battery. Traction battery 24 is electrically connected to power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32 of EV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Power electronics module 26 and power conversion module 32 are power modules which handle high-voltage (HV) electrical power in their operations. For instance, the inverter of power electronics module 26 converts HV DC electrical power from traction battery 24 into the requisite AC electrical power for driving traction motor 14. The DC/DC converter of power conversion module 32 converts AC electrical power from grid 36 into HV DC electrical power for charging traction battery 24. Power electronics module 26 may further include its own DC/DC converter for use in converting the HV DC electrical power from traction battery 24 into a lower voltage DC electrical power for the inverter to invert into the requisite AC electrical power for driving traction motor 14.

Power electronics module 26 and power conversion module 32 include corresponding electronics assemblies for performing their associated electrical power operations. Each electronics assembly may include one or more power stages having a transistor-based switching arrangement, such as one or more half-bridges that are stacked in an assembly. Each half bridge may include first and second electrical switching units with each switching unit including a transistor connected in anti-parallel with a diode. Each half bridge may include a positive DC lead and a negative DC lead between which the first and second switching units are connected. The half bridges of the inverter of power electronics module 26 may further include one or more AC output leads (e.g., three AC output leads for three-phase power) electrically connected to traction motor 14.

Power modules such as power electronics module 26 and power conversion module 32 generate heat during their operation. A proper cooling mechanism is desired for the reliable operation of the power modules. The cooling technique used for a power module directly affects the size of the power module as a better cooling approach can allow higher power density in the power module. In addition to size reduction, other considerations such as reliability, manufacturing expense, lower parasitic, ease of assembly, etc., are relevant design criteria for power modules.

The present disclosure provides a power module with cooling arrangement which addresses many of the relevant design criteria. The power module with cooling arrangement may be for a power inverter such as power electronics module 26 or for a power converter such as power conversion module 32, as described above, or may be for another type of power electronics. In general, the cooling arrangement provides a substrate-embedded, microchannel approach for the cooling of the power module. In variations, the cooling arrangement utilizes a double-bond-copper (DBC) substrate for micron size cooling channels. Such design allows a relatively large reduction in the size of the power module due to better cooling. The design of the power module and the DBC based microchannels will now be described in greater detail.

Figure 3:
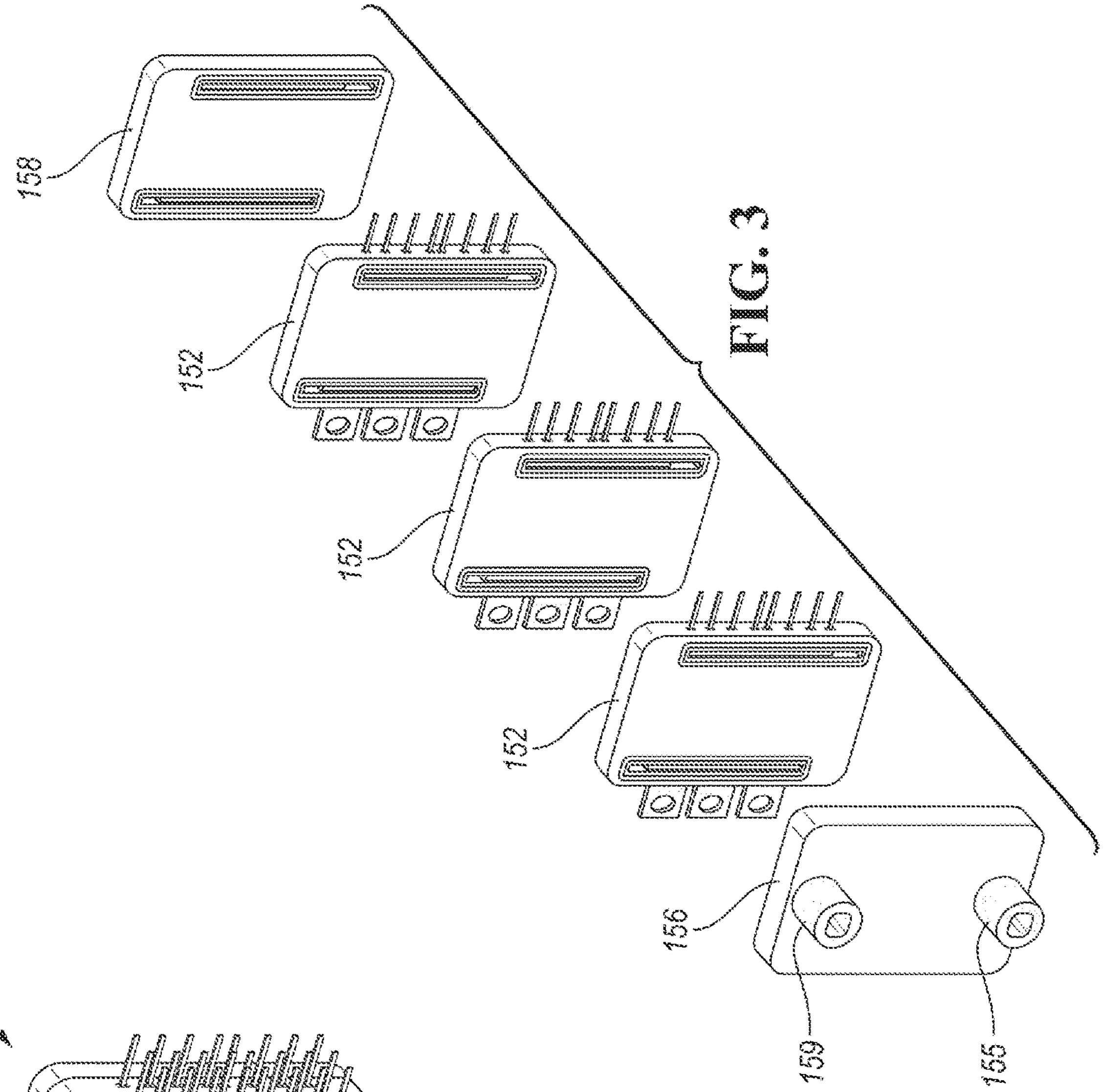
FIG. 3 illustrates an exploded view of the power module with each of the power module cells, the front cover plate, and the rear cover plate being individually depicted.
Figure 2:
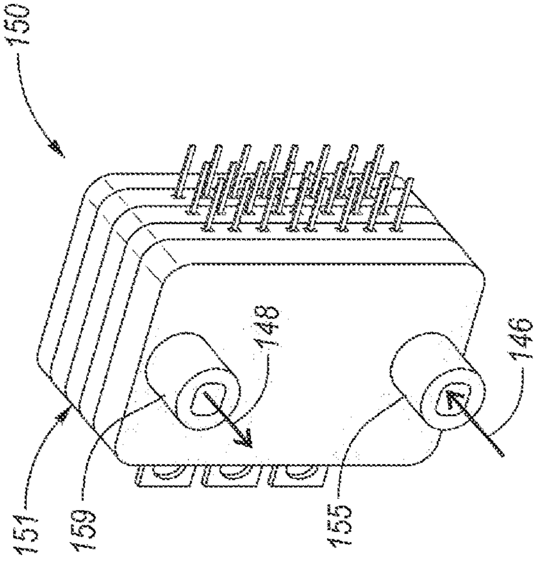
FIG. 2 illustrates a perspective view of a power module in accordance with the present disclosure, the power module including a stack of power module cells, a front cover plate, and a rear cover plate with the power module cells being stacked between the front cover plate and the rear cover plate.

Referring now to FIGS. 2 and 3, perspective and exploded views of a power module 150 in accordance with the present disclosure are shown, respectively. Power module 150 includes a stack (array) 151 of power module cells (units) 152. Power module 150 further includes a front cover plate 156 and a rear cover plate 158. Power module cells 152 are stacked between front cover plate 156 and rear cover plate 158 to form the assembled power module 150, shown in FIG. 2.

In the illustrated example, stack 151 of power module cells 152 includes three power module cells. More or less power module cells by be included in stack 151.

Figure 4:
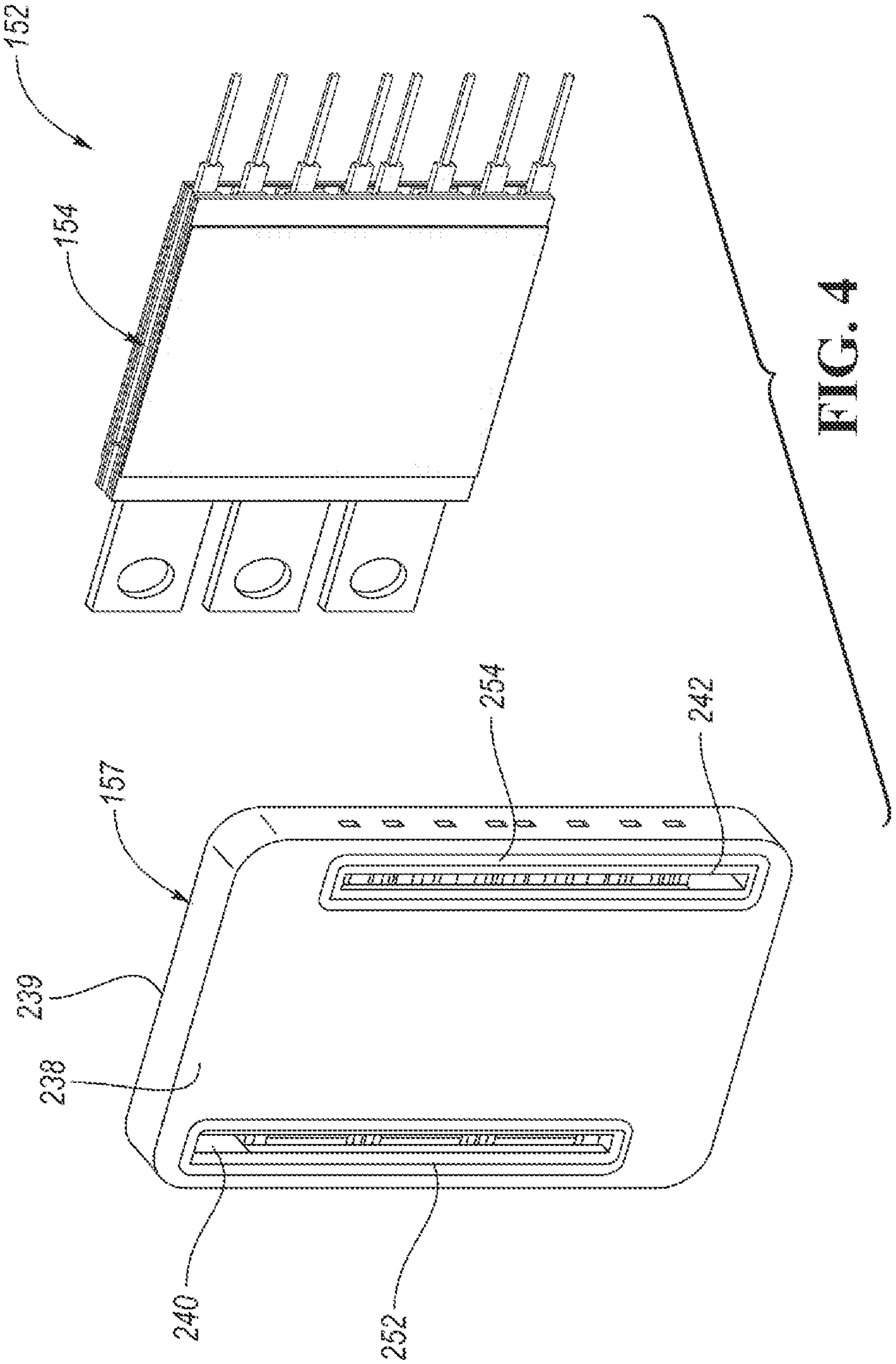
FIG. 4 illustrates an exploded view of a power module cell with a frame and a power stage of the power module cell being individually depicted.

Each power module cell 152 includes a power stage 154 and a frame 157, which are separate components as shown by the exploded power module cell view in FIG. 4. Power stage 154 is housed within frame 157 to form the assembled power module cell 152 (three assembled power module cells 152 are shown in FIG. 3). Frame 157 may be an epoxy molding compound (EMC) encapsulation. Frame 157 provides a mechanical support structure and electrical insulation for power stage 154. As discussed below, frame 157 further functions as a coolant flow guide for power stage 154.

Front cover plate 156 includes a coolant inlet port 155 and a coolant outlet port 159. Coolant inlet and outlet ports 155 and 159 are in fluid communication with channels defined within stack 151 of power module cells 152. As discussed below, the channels are microchannels. Used herein, a "microcharmel" is a channel with a hydraulic diameter below one millimeter (mm) During operation, the coolant is circulated across power module cells 152 to cool the switching arrangements of power stages 154 of the power module cells.

As set forth, power module 150 is a power module with a cooling arrangement taking the form of integrated microcharmel cooling. In FIG. 2, inlet arrow 146 and outlet arrow 148 indicate the direction of coolant flow at coolant inlet and outlet ports 155 and 159.

Figure 5:
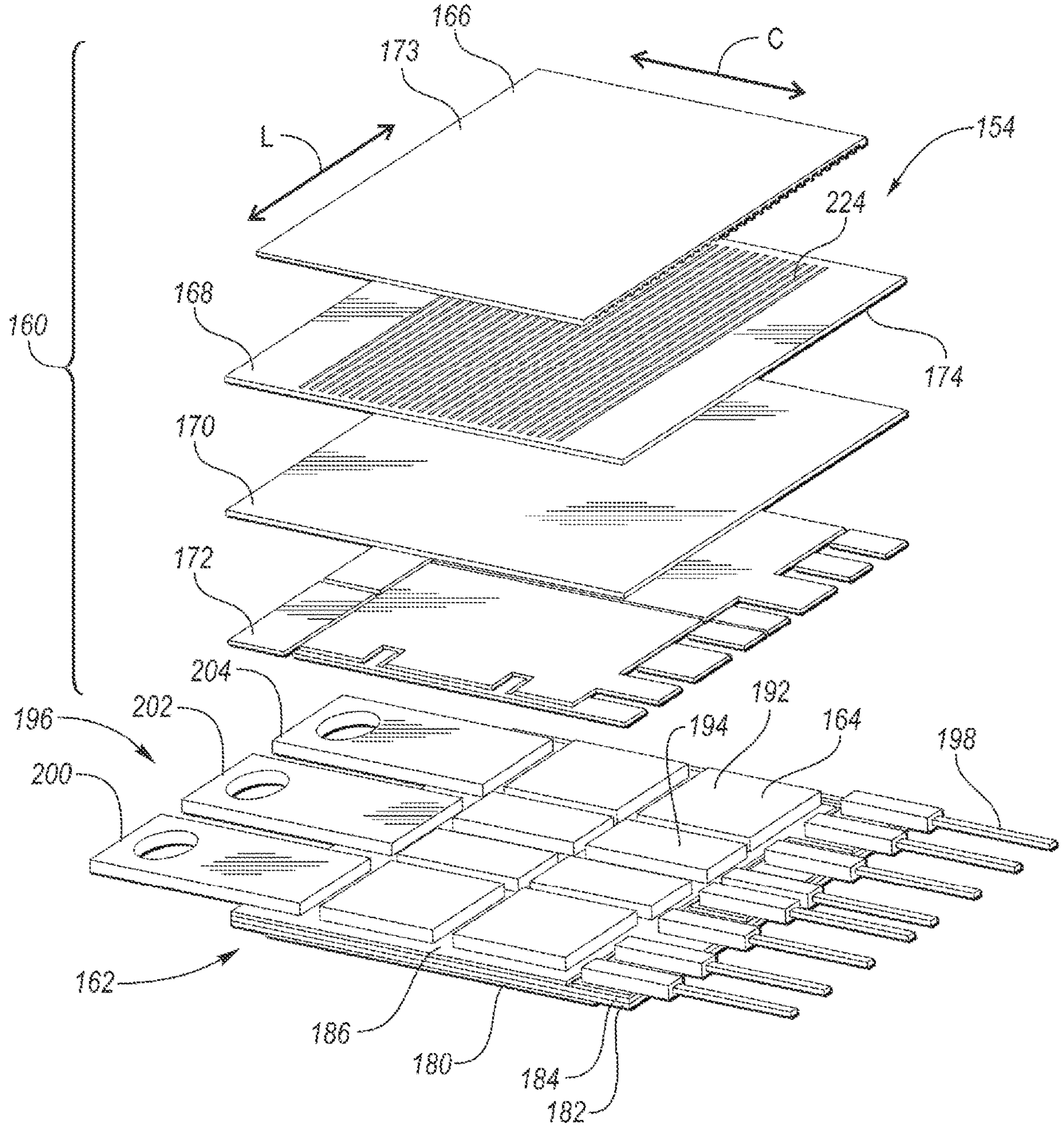
FIG. 5 illustrates an exploded view of the power stage.

Referring now to FIG. 5, with continual reference to FIG. 4, an exploded view of a power stage 154 of a power module cell 152 of power module 150 is shown. Power stage 154 includes a first substrate 160, a second substrate 162, and a plurality of electrical switching units 164. Switching units 164 are sandwiched between first substrate 160 and second substrate 162 to assemble power stage 154. Power stage 154 has a lengthwise direction (L) and a crosswise direction (C).

First substrate 160 includes an outer plate 166, an interior plate 168, a dielectric layer (insulator) 170, and an inner plate 172. Outer plate 166 defines an outer major side 173 of power stage 154. Inner plate 172 defines an inner major side of first substrate 160. The thin edges of the plates and dielectric layer collectively define a portion of a minor sides 174 of first substrate 160. In variations, outer plate 166 and interior plate 168 may be a single plate.

First substrate 160 may be a direct-bonded cooper (DBC) substrate. Plates 166, 168, 172 and dielectric layer 170 may be bonded together by a high-temperature oxidation process for example. Plates 166, 168, 172 may be metal such as copper, aluminum, silver, or gold. Inner plate 172 may be patterned copper. The term "patterned" refers to a plate that has been etched to define an electrical circuit. Dielectric layer 170 may be ceramic. Example ceramics include alumina, aluminum nitride, and silicon nitride. The ceramics may be doped.

Second substrate 162 is similarly arranged as first substrate 160. As such, second substrate 162 also includes an outer plate 180, an interior plate 182, a dielectric layer 184, and an inner plate 186. The materials and configuration of the plates and the dielectric layer may be similar to that described above with respect to first substrate 160.

In the example shown in FIG. 5, power stage 154 includes four electrical switching units 164. Each switching unit 164 includes a transistor 192 and a diode 194. Of course, other switching unit configurations are contemplated. Each switching unit 164 is electrically connected to inner plate 172 of first substrate 160 and/or inner plate 186 of second substrate 162. Power stage 154 may include a plurality of shims (not shown) that electrically connect switching units 164 to one or both of the inner plates and act as spacing features. A mold compound may encapsulate the internal components of power stage 154.

Power stage 154 further includes electric power terminals 196 and electric signal pins 198. For example, in the case of power module 150 being power electronics module 26 of EV 12, power terminals 196 include a positive DC terminal 200, a negative DC terminal 202, and an AC terminal 204, with the DC terminals being electrically connected with a capacitor bank of the inverter of the power electronics module and traction battery 24 and the AC terminal 204 being electrically connected to traction motor 14, and with signal pins 198 being electrically connected to a gate drive board provided for power electronics module 26. The terminals and pins may be formed by a patterned inner plate or may be separate components attached to switching units 164.

One or both of substrates 160 and 162 may include a network of channels or microchannels configured to circulate coolant to thermally cool power stage 154. In the example shown in FIG. 5, both substrates 160 and 162 have microchannels. The microchannels are defined in the outer plate and the interior plate of each substrate.

As described and as shown in FIG. 5, power stage 154 of a power module cell 152 of power module 150 is made of up different layers. Power devices (i.e., electrical switching units 192) are sandwiched between top and bottom (DBC) substrates 160 and 162. The outer plate and the interior plate of each substrate have microchannels. The arrangement of the microchannels in these two substrate layers (i.e., the outer plate and the interior plate) allow coolant flow with minimal pressure drop and better cooling. In this regard, the outer plate functions as a manifold layer.

Figure 6:
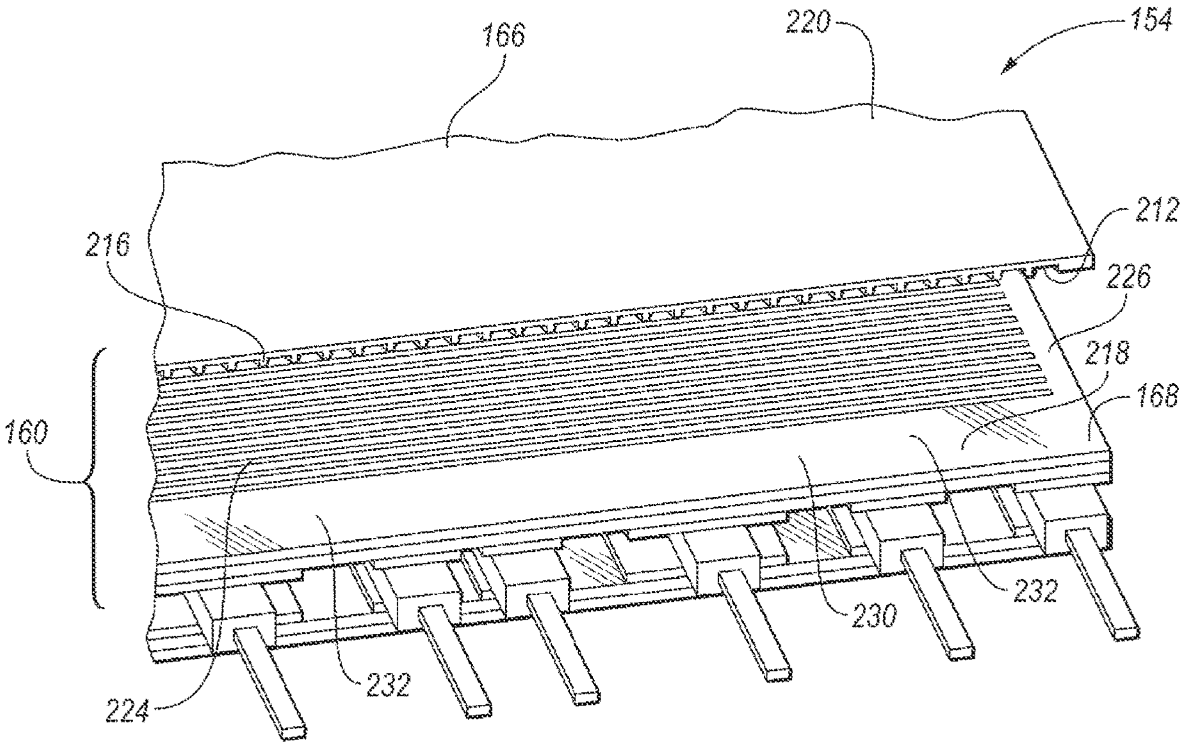
FIG. 6 illustrates an exploded partial view of the power stage.
Figure 7A:
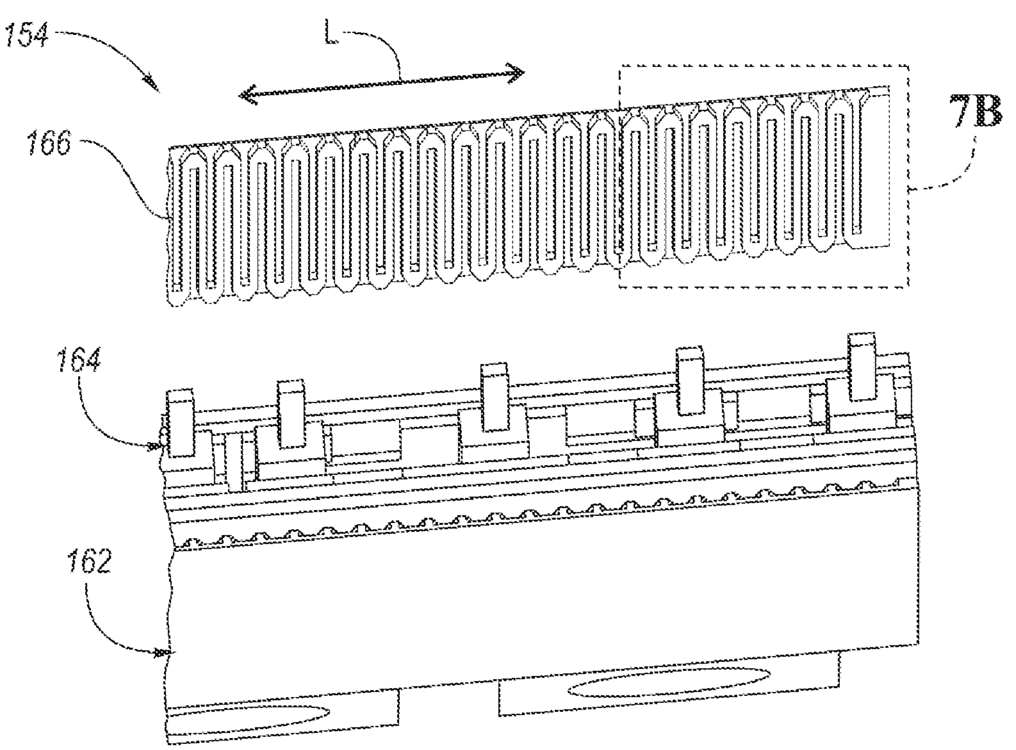
FIG. 7A illustrates another exploded partial view of the power stage.
Figure 7B:
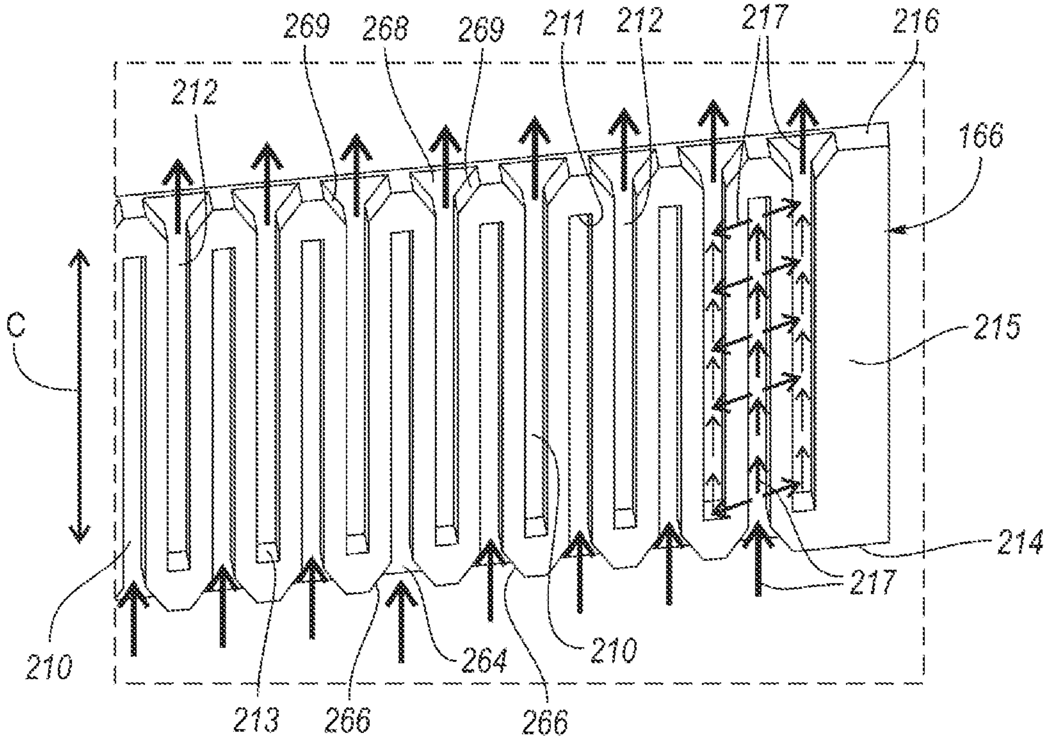
FIG. 7B illustrates an enlarged view of a part of an outer plate of a substrate of the power stage corresponding to the framed portion of FIG. 7A.

Referring now to FIGS. 6, 7A, and 7B, with continual reference to FIG. 5, power stage 154 of a power module cell 152 of power module 150 will be described in further detail. FIGS. 6 and 7A illustrate respective exploded partial views of power stage 154; and FIG. 7B illustrates an enlarged view of outer plate 166 of first substrate 160 of power stage 154 corresponding to the framed portion of FIG. 7A.

In first substrate 160 of power stage 154, outer plate 166 includes a first side 214 and a second side 216 that oppose one another in crosswise direction (C) of the power stage, and further includes a backside 220. Outer plate 154 defines first microchannels 210, first microchannel impeding portions 211, second microchannels 212, and second microchannel impeding portions 213. First and second microchannels 210 and 212 and first and second microchannel impeding portions 211 and 213 are defined on an inner surface 215 of outer plate 166. Inner surface 215 of outer plate 166 is the surface of the outer plate facing interior plate 168.

First microchannels 210 and second microchannels 212 are placed between one another so that the first and second microchannels alternate in the lengthwise direction (L) of outer plate 166. First and second microchannels 210 and 212 are recessed into inner surface 215 of outer plate 166 but do not extend completely through the thickness of the outer plate.

First microchannels 210 are oriented to extend in the crosswise direction (C) of outer plate 166 partly across the outer plate starting from first side 214 of the outer plate. That is, first microchannels 210, which extend from first side 214, do not extend to second side 216 of outer plate 166. First microchannels 210 do not extend to second side 216 as first microchannel impeding portions 211 block the first microchannels from extending to the second side. In this regard, first microchannel impeding portions 211 are positioned along first microchannels 210 at locations spaced apart from second side 216.

Likewise, second microchannels 212 are oriented to extend in the crosswise direction (C) of outer plate 166 partly across the outer plate starting from second side 216 of the outer plate. That is, second microchannels 212, which extend from second side 216, do not extend to first side 214 of outer plate 166. Second microchannels 212 do not extend to first side 214 as second microchannel impeding portions 213 block the second microchannels from extending to the first side. In this regard, second microchannel impeding portions 213 are positioned along second microchannels 212 at locations spaced apart from first side 214.

All of first microchannels 210 may be parallel or at least substantially parallel with each other and all of second microchannels 212 may be parallel or at least substantially parallel with each other. First and second microchannels 210 and 212 may also be parallel or at least substantially parallel with each other. Used herein, "substantially parallel" means within plus or minus three degrees of parallel.

As described, outer plate 166 is designed to impede coolant flow before the coolant can traverse entirely across the outer plate. First and second microchannel impeding portions 211 and 213 provide this configuration.

Further in first substrate 160 of power stage 154, interior plate 168 defines third microchannels 224. Third microchannels 224 are defined on an outer surface 218 of a front side 230 of interior plate 168. Outer surface 218 of interior plate 168 is the surface of the interior plate facing outer plate 166. Particularly, outer surface 218 of interior plate 168 and inner surface 215 of outer plate 166 face one another.

Third microchannels 224 are recessed into outer surface 218 of interior plate 168 but do not extend completely through the thickness of the interior plate.

Third microchannels 224 are oriented to extend in the lengthwise direction (L) of power stage 154 partly across interior plate 168 between a "top" side 226 and a "bottom" side (not shown) of the interior plate. As third microchannels 224 extend in the lengthwise direction (L) and as first and second microchannels 210 and 212 extend in the crosswise direction (C), the third microchannels crisscross with the first and second microchannels. In this regard, third microchannels 224 are orthogonal or substantially orthogonal to first and second microchannels 210, 212.

All of third microchannels 224 may be parallel or substantially parallel with each other. Third microchannels 224 are arranged over a footprint of switching arrangement 164. This creates a border 232 along the "right" side of interior plate 168 and the "left" side (not shown) of the interior plate. Outer plate 166 is smaller, e.g., narrower, than interior plate 168 so that a portion of border 232 (especially the side borders) is exposed.

Second substrate 162 of power stage 154 may have the same microchannel arrangement as first substrate 160. Briefly, the outer plate of second substrate 162 may include first microchannels and second microchannels that are the same or similar to first and second microchannels 210, 212 and the interior plate of the second substrate may include third microchannels that are the same or similar to third microchannels 224.

As described and as shown in FIGS. 6, 7A, and 7B, the outermost substrate layer (i.e., outer plate 166) acts as a manifold for coolant to flow in third microchannels 224 of interior plate 168. Outer plate 166 and interior plate 168, when bonded with first and second microchannels 210 and 212 of the inner surface of the outer plate facing third microchannels 224 of the outer surface of the interior plate, allow complex three-dimensional coolant flow. Arrows 217 indicate the flow direction.

Figure 8:
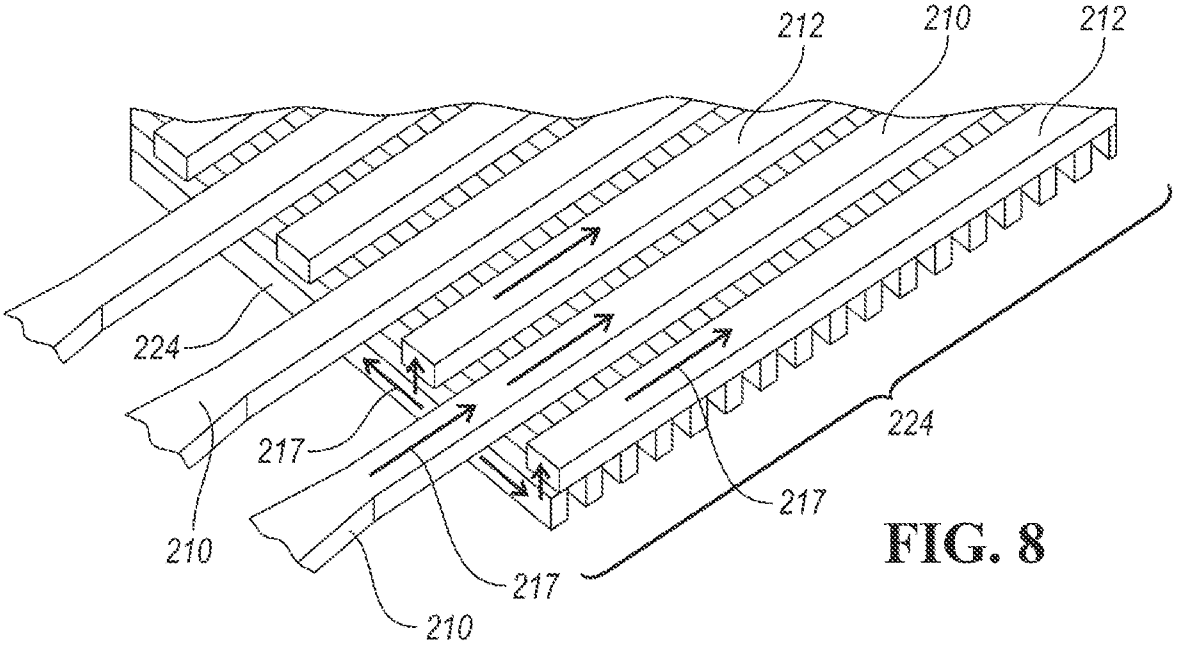
FIG. 8 illustrates a schematic representation of first microchannels and second microchannels of the outer plate of the substrate of the power stage and third microchannels of an interior plate of the substrate of the power stage.

FIG. 8 illustrates a schematic representation of first microchannels 210 and second microchannels 212 of outer plate 166 and third microchannels 224 of interior plate 168. The coolant pathway between the microchannels is shown by arrows 217, which indicate the flow direction between incoming and outgoing coolant.

Figure 9:
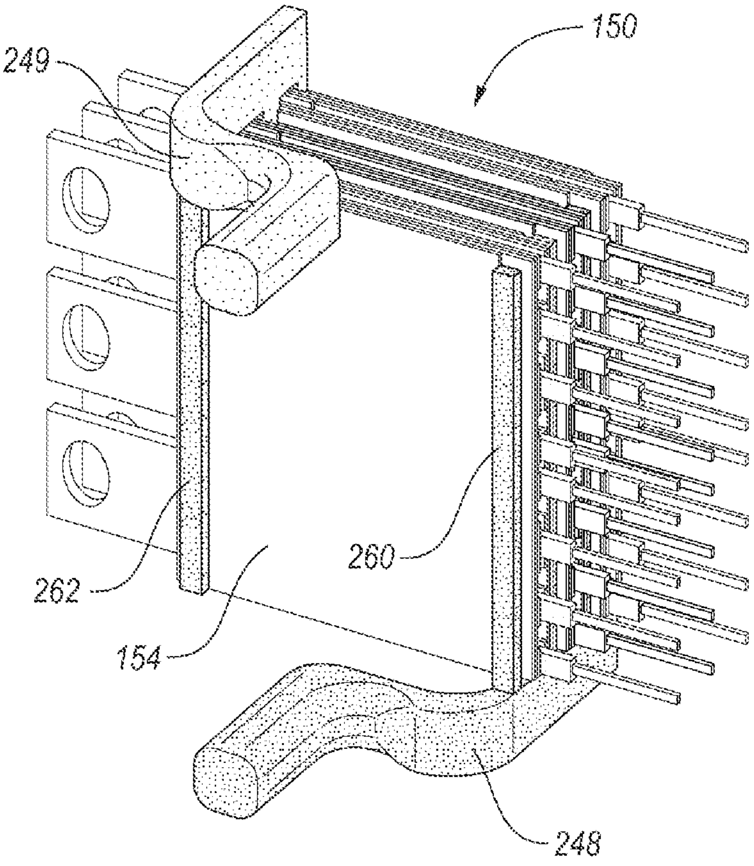
FIG. 9 illustrates a schematic representation of an example coolant circuit of the power module showing the power stages and a solid representation of the coolant circuit, wherein the shown coolant circuit (shown stippled) is not an actual structural component disposed within the power module—rather, various structural features of the power module define boundaries of the shown coolant circuit, which is void space.

Referring now to FIG. 9, with continual reference to FIGS. 4 and 7B, power module 150 will be described in greater detail. Initially, FIG. 9 illustrates a schematic representation of an example coolant circuit of power module 150 showing power stages 154 and a solid representation of the coolant circuit. The shown coolant circuit (shown stippled) is not an actual structural component disposed within power module 150. Rather, various structural features of power module 150 define boundaries of the shown coolant circuit, which is void space. Further, as previously described, frame 157 of a power module cell 152 of power module 150 is individually depicted in FIG. 4.

As shown in FIG. 4, power module cell 152 includes opposing major sides 238 and 239. Frame 157 defines openings 240 and 242 that extend between opposing major sides 238, 239 (i.e., openings 240, 242 extend through the thickness of frame 157). Frame 157 also defines slots 252 and 254 formed on only one of the major sides or on both major sides. That is, each power module cell 152 may include two slots or four slots (illustrated example). Slots 252, 254 are recessed into frame 157 such that substrate borders 232 are exposed to receive coolant.

As discussed above, a plurality of power module cells 152 are stacked together to form the assembled power module 150 (shown in FIG. 2). When stacked, openings 240, 242 and slots 252, 254 of adjacent power module cells 152 cooperate (come together) to define portions of a coolant circuit. Particularly, slots 254 of adjacent power module cells 152 cooperate to form coolant supply headers 260 that are interleaved with power stages 154. Each power module cell 152 has two associated coolant supply headers 260 which supply coolant to first substrate 160 and second substrate 162, respectively. Supply headers 260 push coolant into power stage 154 from one opposing major side of the power stage. Openings 242 of adjacent power module cells 152 cooperate to form a coolant supply manifold 248 that extends across stack 151. Coolant supply headers 260 open into coolant supply manifold 248. Coolant supply manifold 248 is in fluid communication with inlet port 155.

Similarly, slots 252 of adjacent power module cells 152 cooperate to form coolant return headers 262 that are interleaved with power stages 154. Each power module cell 152 has two associated coolant return headers 260 which return coolant from first substrate 160 and second substrate 162, respectively. Return headers 260 pull coolant out from power stage 154 toward the other opposing major side of the power stage. Openings 240 of adjacent power module cells 152 cooperate to form a coolant return manifold 249 that extends across stack 151. Coolant return headers 262 open into coolant return manifold 249. Coolant return manifold 249 is in fluid communication with outlet port 159.

First microchannels 210 are in fluid communication with coolant supply manifold 248 via coolant supply header 260. For example, each of first microchannels 210 may include an edge opening (entrance hole) 264 that opens into coolant supply header 260. Edge opening 264 includes a pair of slanted sides 266 to facilitate the flow of coolant from coolant supply header 260 into first microcharmel 210.

Conversely, second microchannels 212 are in fluid communication with coolant return manifold 249 via coolant return header 262. For example, each of second microchannels 212 may include an edge opening (entrance hole) 268 that opens into coolant supply header 260. Edge opening 268 includes a pair of slanted sides 269 to facilitate the flow of coolant out from second microchannel 212 into coolant return header 262.

As described above with reference to FIGS. 7B and 8, first and second microchannels 210 and 212 of outer plate 166 do not extend in the crosswise direction (C) of power stage 154 entirely between coolant supply manifold 248 and coolant return manifold 249 and the first and second microchannels are in fluid communication with one another via third microchannels 224 of interior plate 168.

During operation, coolant (such as ethylene glycol) is circulated from coolant inlet port 155 and into coolant supply manifold 248 and into coolant supply header 260 and into first microchannels 210 (see FIG. 7B). As such, the coolant is pushed directly into first microchannels 210 and flows in crosswise direction (C) of power stage 154 to distribute the coolant partly over the major side(s) 238, 239 of power module 152. All of the coolant from first microchannels 210 flows into third microchannels 224. Third microchannels 224 circulate the coolant in the lengthwise direction (L) of power stage 154 and convey all of the fluid to second microchannels 212. Second microchannels 212 circulate the coolant in crosswise direction (C) of power stage 154 to distribute the coolant partly over major side(s) 238, 239 of power module 152. All of the coolant flows out of second microchannels 212 directly to coolant return header 249 and out to coolant return manifold 249 and out to outlet port 159.

Second substrates 162, when provided with corresponding first, second, and third microchannels, are also in fluid communication with coolant supply header 260 and coolant return header 262 and may circulate coolant in a same or similar manner to that described above.

Figure 10A:
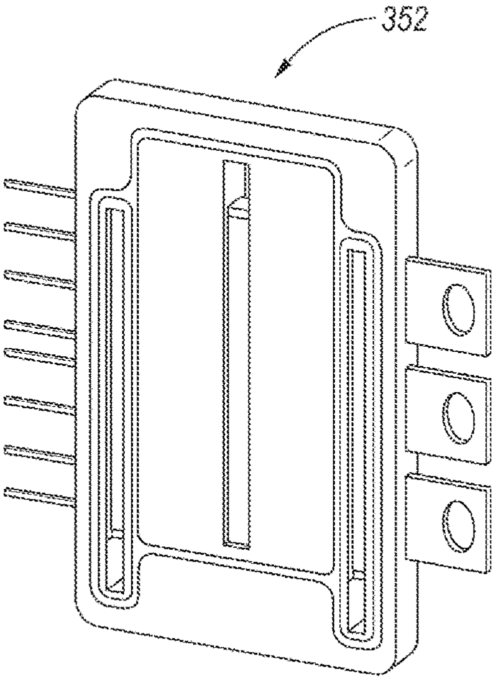
FIG. 10A illustrates a perspective view of a power module cell in accordance with another embodiment of the present disclosure.
Figure 10B:
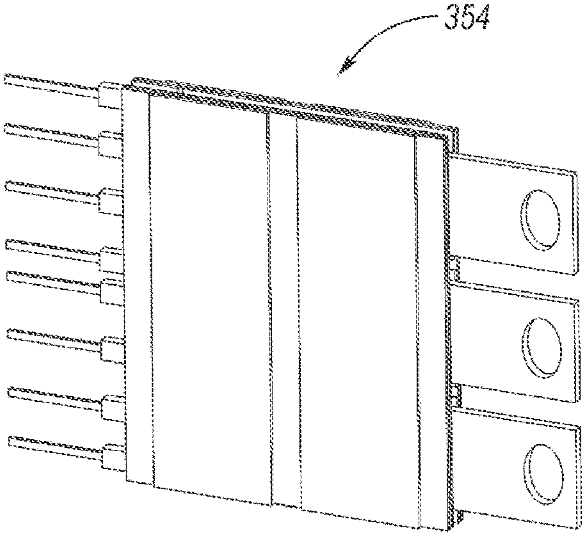
FIG. 10B illustrates a perspective view of the power stage of the power module cell.
Figure 10C:
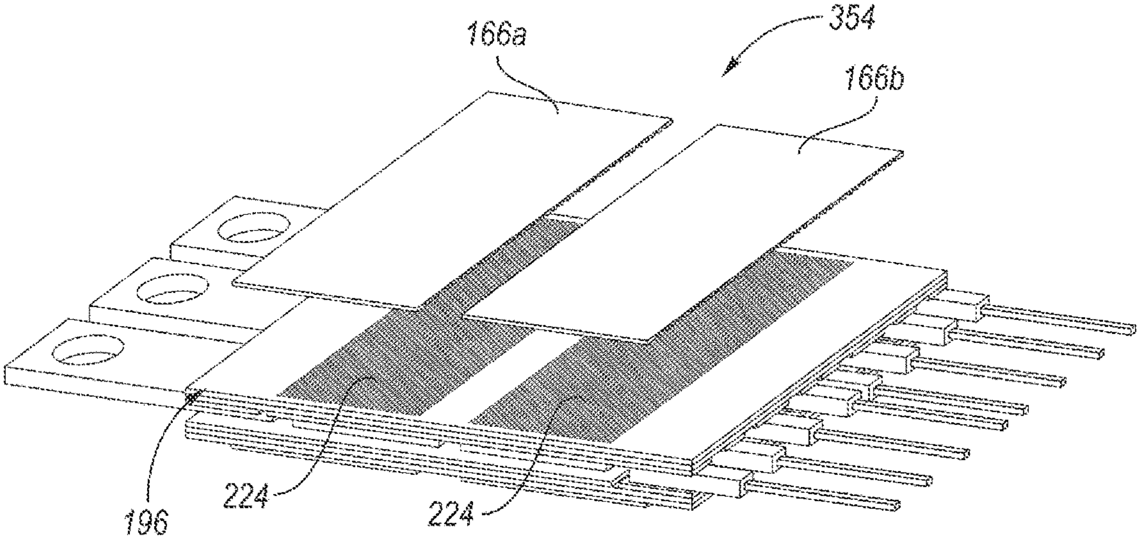
FIG. 10C illustrates an exploded view of the power stage of the power module cell.

Referring now to FIGS. 10A, 10B, and 10C, a power module cell 352 in accordance with another embodiment of the present disclosure will be described. FIG. 10A illustrates a perspective view of power module cell 352. FIGS. 10B and 10C illustrate perspective and exploded views of a power stage 354 of power module cell 352, respectively. Instead of a substrate having a single outer plate as configured in power stage 154 of power module cell 152, a substrate of power stage 354 includes two outer plates 166*a* and 166*b* and the coolant flow is directed towards the center of power stage 354.

Other power module cell embodiments may employ a planar arrangement of power stages. In this case, the power stages are places end-to-end to be coplanar.

As described, a power module cooling arrangement in accordance with the present disclosure provides substrate-embedded, microchannel cooling of the power module. The power module with cooling arrangement may include one or more of the following advantages or attributes: modular design; reduction in power module size/volume; better cooling due to highly turbulent flow and increased surface area for heat removal; relatively lower pressure drop in the context of microchannel flows; and ease of manufacturing and assembly.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A power module comprising:

a power module cell including a power stage having a substrate and being arranged in a stack that defines a supply manifold and a return manifold; and wherein the substrate includes a first plate and a second plate, the first plate including a first edge at a first side of the first plate and a second edge at a second side of the first plate, the first side and the second side opposed from one another, the width of the first plate being equal to the distance from the first edge to the second edge, the first plate further includes first microchannels, the first microchannels not extending completely through a thickness of the first plate and extending from the first edge partially across the first plate towards the second edge and configured to input coolant from the supply manifold and impeded from outputting coolant directly to the return manifold, the first plate further includes second microchannels, the second microchannels not extending completely through the thickness of the first plate and extending from the second edge partially across the first plate towards the first edge and configured to output coolant to the return manifold and impeded from inputting coolant directly from the supply manifold, and the second plate includes third microchannels crisscrossing the first and second microchannels and connecting the first and second microchannels in fluid communication; and wherein the first plate further includes first microchannel impeding portions positioned along the first microchannels and defining terminal portions of the first microchannels at locations spaced apart from the second edge and configured to prevent direct fluid communication between the first microchannels and the return manifold to impede the first microchannels from outputting coolant directly to the return manifold, and second microchannel impeding portions positioned along the second microchannels and defining terminal portions of the second microchannels at locations spaced apart from the first edge and configured to prevent direct fluid communication between the second microchannels and the supply manifold to impede the second microchannels from inputting coolant directly from the supply manifold.

2. The power module of claim 1 wherein:

the first microchannels and the second microchannels are at least substantially parallel to one another.

3. The power module of claim 2 wherein:

the third microchannels are orthogonal to the first microchannels and to the second microchannels.

4. The power module of claim 1 wherein:

the first plate and the second plate are bonded together.

5. The power module of claim 1 further comprising:

a second power module cell including a second power stage having a second substrate and being arranged in the stack; and wherein the second substrate of the second power stage includes fourth microchannels configured to input coolant from the supply manifold and impeded from outputting coolant to the return manifold, fifth microchannels configured to output coolant to the return manifold and impeded from inputting coolant from the supply manifold, and sixth microchannels crisscrossing and connecting the fourth and fifth microchannels in fluid communication.

6. The power module of claim 1 wherein:

the power stage further includes a transistor-based switching arrangement supported on one side on the substrate.

7. The power module of claim 6 wherein:

the power stage further includes a second substrate;

the transistor-based switching arrangement supported on another side on the second substrate; and the second substrate including fourth microchannels configured to input coolant from the supply manifold and impeded from outputting coolant to the return manifold, fifth microchannels configured to output coolant to the return manifold and impeded from inputting coolant from the supply manifold, and sixth microchannels crisscrossing and connecting the fourth and fifth microchannels in fluid communication.

8. The power module of claim 1 wherein:

the supply manifold and the return manifold are disposed on opposing sides of the stack.

9. The power module of claim 1 wherein:

the power module is a power module of a traction powertrain of an electrified vehicle.

10. A power module cell comprising:

a substrate including a first plate and a second plate, the first plate including a first edge at a first side of the first plate and a second edge at a second side of the first plate, the first side and the second side opposed from one another, the width of the first plate being equal to the distance from the first edge to the second edge; and a microchannel network including first microchannels defined by the first plate, the first microchannels not extending completely through a thickness of the first plate and extending partially across the first plate from the first edge towards the second edge, the microchannel network further including second microchannels defined by the first plate, the second microchannels not extending completely through the thickness of the first plate and extending partially across the first plate from the second edge towards the first edge, and the microchannel network further including third microchannels defined by the second plate, the third microchannels crisscrossing the first and second microchannels and connecting the first and second microchannels in fluid communication; and wherein the microchannel network further includes first microchannel impeding portions defined by the first plate, the first microchannel impeding portions positioned along the first microchannels and defining terminal portions of the first microchannels at locations spaced apart from the second edge to thereby impede the first microchannels from extending to the second edge of the substrate, and the microchannel network further includes second microchannel impeding portions defined by the first plate, the second microchannel impeding portions positioned along the second microchannels and defining terminal portions of the second microchannels at locations spaced apart from the first edge to thereby impede the second microchannels from extending to the first edge of the substrate.

11. The power module cell of claim 10 wherein:

the first microchannels and the second microchannels are at least substantially parallel to one another; and the third microchannels are orthogonal to the first microchannels and to the second microchannels.

12. A power module comprising:

a plurality of power module cells each including a power stage having a substrate and a transistor-based switching arrangement supported on the substrate, the power module cells being arranged in a stack that defines a coolant supply manifold and a coolant return manifold disposed on opposing sides of the stack and extending along a length of the stack; and wherein, for each power module cell, the substrate includes a first plate and a second plate which define a network of microchannels connecting the coolant supply manifold and the coolant return manifold, the network of microchannels including first microchannels defined by the first plate, the first microchannels not extending completely through a thickness of the first plate and extending partially across the first plate from a first edge of the first plate towards a second edge of the first plate and the first microchannels configured to input coolant directly from the coolant supply manifold, the network of microchannels further includes second microchannels defined by the first plate, the second microchannels not extending completely through the thickness of the first plate and extending partially across the first plate from the second edge towards the first edge and the second microchannels configured to output coolant directly to the coolant return manifold, the width of the first plate being equal to the distance from the first edge to the second edge, and the network of microchannels further includes third microchannels defined by the second plate, the third microchannels crisscrossing the first and second microchannels and connecting the first and second microchannels in fluid communication; and for each power module cell, the network of microchannels further includes first microchannel impeding portions defined by the first plate, the first microchannel impeding portions being positioned along the first microchannels and defining terminal portions of the first microchannels at locations spaced apart from the second edge and configured to prevent direct fluid communication between the first microchannels and the coolant return manifold to impede the first microchannels from outputting coolant directly to the coolant return manifold, and the network of microchannels further includes second microchannel impeding portions defined by the first plate, the second microchannel impeding portions being positioned along the second microchannels at locations spaced apart from the first edge and configured to prevent direct fluid communication between the second microchannels and the coolant supply manifold to impede the second microchannels from inputting coolant directly from the coolant supply manifold.

13. The power module of claim 12 wherein:

for each power module cell, the first microchannels and the second microchannels are at least substantially parallel to one another.

14. The power module of claim 13 wherein:

for each power module cell, the third microchannels are orthogonal to the first microchannels and to the second microchannels.

* * * * *